(12) United States Patent
Kaehler et al.

(10) Patent No.: US 9,279,691 B2
(45) Date of Patent: *Mar. 8, 2016

(54) METHOD AND APPARATUS FOR TWO-STAGE PLANNING

(71) Applicant: APPLIED INVENTION, LLC, Burbank, CA (US)

(72) Inventors: Adrian Kaehler, Los Feliz, CA (US); Kjerstin Williams, Los Angeles, CA (US); Mark E. Duttweiler, Sherman Oaks, CA (US)

(73) Assignee: APPLIED INVENTION, LLC, Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/521,291

(22) Filed: Oct. 22, 2014

(65) Prior Publication Data

US 2015/0046089 A1 Feb. 12, 2015

Related U.S. Application Data

(63) Continuation of application No. 13/926,922, filed on Jun. 25, 2013, now Pat. No. 8,898,016.

(60) Provisional application No. 61/800,424, filed on Mar. 15, 2013.

(51) Int. Cl.
   *G01C 21/34* (2006.01)
   *G05D 1/02* (2006.01)

(52) U.S. Cl.
   CPC ............ *G01C 21/34* (2013.01); *G01C 21/3407* (2013.01); *G05D 1/0212* (2013.01)

(58) Field of Classification Search
   CPC .......... G08G 1/16; G08G 1/167; G01C 21/34; G01C 21/3407; G05D 1/0212
   See application file for complete search history.

(56) References Cited

U.S. PATENT DOCUMENTS

| | | | | |
|---|---|---|---|---|
| 5,587,929 A * | 12/1996 | League et al. | ................ | 342/159 |
| 6,173,215 B1 * | 1/2001 | Sarangapani | ................. | 700/255 |
| 6,385,539 B1 * | 5/2002 | Wilson et al. | ................. | 701/468 |
| 7,046,171 B2 * | 5/2006 | Yanai | ......................... | 340/995.1 |
| 7,110,881 B2 * | 9/2006 | Gray et al. | ..................... | 701/25 |
| 7,505,848 B2 * | 3/2009 | Flann et al. | ..................... | 701/425 |
| 7,920,968 B2 * | 4/2011 | Chapin et al. | ................. | 701/426 |
| 8,019,475 B2 * | 9/2011 | Kuroda | ......................... | 700/255 |
| 8,024,115 B2 * | 9/2011 | Hayashida et al. | ........... | 701/414 |
| 8,543,261 B2 * | 9/2013 | Anderson et al. | ................ | 701/3 |
| 8,560,231 B2 * | 10/2013 | Vu et al. | ......................... | 701/437 |
| 2005/0192749 A1 * | 9/2005 | Flann et al. | ................... | 701/301 |
| 2006/0178820 A1 * | 8/2006 | Eglington et al. | ............ | 701/209 |
| 2010/0138146 A1 * | 6/2010 | Vogt et al. | ..................... | 701/201 |
| 2011/0082804 A1 * | 4/2011 | Swinson et al. | .............. | 705/306 |
| 2011/0178966 A1 * | 7/2011 | Nikovski | ......................... | 706/12 |
| 2012/0221207 A1 * | 8/2012 | Nakamura | ...................... | 701/41 |
| 2012/0271483 A1 * | 10/2012 | Samukawa et al. | ............... | 701/1 |
| 2013/0218467 A1 * | 8/2013 | Ogawa et al. | ................. | 701/533 |

\* cited by examiner

*Primary Examiner* — Mussa A Shaawat
*Assistant Examiner* — Kelly D Williams
(74) *Attorney, Agent, or Firm* — Michael A. Glenn; Perkins Coie LLP

(57) ABSTRACT

A plan through a space having a near field and a far field is determined. Using a sensor device, measurements of the far field are obtained and stored in an electronic memory. A processor uses the measurements to determine the viability of each far field plan among a plurality of candidate far field plans. The processor also determines a flexibility score for each of the candidate far field plans and selects a composite plan comprising the viable far field plan having a highest flexibility score among the viable candidate far field plans.

19 Claims, 9 Drawing Sheets

# METHOD AND APPARATUS FOR TWO-STAGE PLANNING

CROSS REFERENCE TO RELATED APPLICATIONS

This application is a continuation of U.S. patent application Ser. No. 13/926,922, filed Jun. 25, 2013, and entitled "METHOD AND APPARATUS FOR TWO-STAGE PLANNING," which claims benefit from U.S. Provisional Patent Application No. 61/800,424, filed Mar. 15, 2013, and entitled "METHOD AND SYSTEM FOR TWO-STAGE PLANNING," both of which are expressly incorporated by reference herein.

GOVERNMENT RIGHTS

This invention was made with government support under contract number FA9453-06-D-0103 awarded by the United States Air Force. The government has certain rights in the invention.

BACKGROUND OF THE INVENTION

1. Technical Field

The invention relates to route planning systems. More particularly, the invention relates to a method and apparatus for two-stage route planning systems.

2. Description of the Background Art

Route planning is critical for autonomous vehicles. For purposes of the discussion herein, an autonomous vehicle, also known as a robotic car, or informally as driverless or self-driving, is a vehicle that is capable of fulfilling the human transportation capabilities of a traditional vehicle. As an autonomous vehicle, it is capable of sensing its environment and navigating without human input. Robotic cars exist mainly as prototypes, but are likely to become more widespread in the near future. Autonomous vehicles sense their surroundings with such techniques as radar, LIDAR, GPS, and computer vision. Advanced control systems interpret sensory information to identify appropriate navigation paths, as well as obstacles and relevant signage. Some autonomous vehicles update their maps based on sensory input, allowing them to find their way through uncharted environments.

Since the late 2000s, significant advances have been made in both technology and legislation relevant to autonomous vehicles. Numerous major companies and research organizations have developed working prototype autonomous vehicles, including Google, Continental Automotive Systems, Bosch, Nissan, Toyota, Audi, and Oxford University. In June 2011, the state of Nevada was the first jurisdiction in the United States to pass a law concerning the operation of autonomous vehicles. The Nevada law went into effect on Mar. 1, 2012.

It would be advantageous to provide a highly efficient and precise route planning system. Such system would be especially useful for autonomous vehicles, e.g. so-called self-driving or robotic vehicles.

SUMMARY OF THE INVENTION

A method and apparatus is provided for determining a plan through a space having a near field and a far field. Using a sensor device, measurements of the far field are obtained and stored in an electronic memory. A processor uses the measurements to determine the viability of each far field plan among a plurality of candidate far field plans. The processor also determines a flexibility score for each of the candidate far field plans and selects a composite plan comprising the viable far field plan having a highest flexibility score among the viable candidate far field plans.

DETAILED DESCRIPTION OF THE INVENTION

Thus, a method and apparatus is provided for determining a plan through a space having a near field and a far field. Using a sensor device, measurements of the far field are obtained and stored in an electronic memory. A processor uses the measurements to determine the viability of each far field plan among a plurality of candidate far field plans. The processor also determines a flexibility score for each of the candidate far field plans and selects a composite plan comprising the viable far field plan having a highest flexibility score among the viable candidate far field plans.

Embodiments of the invention concern a planning system and method for determining a plan through a space that is characterized by distinct near and far domains. The invention is most readily understood with reference to a preferred embodiment in which a route planning system navigates an autonomous vehicle along a roadway.

While the invention is discussed herein in connection with piloting autonomous vehicles along roadways, those skilled in the art will appreciate that the invention is not so limited, and that the invention will find use, for example, with human-operated vehicles, within shipping and air lanes, and the like.

Figure 1:
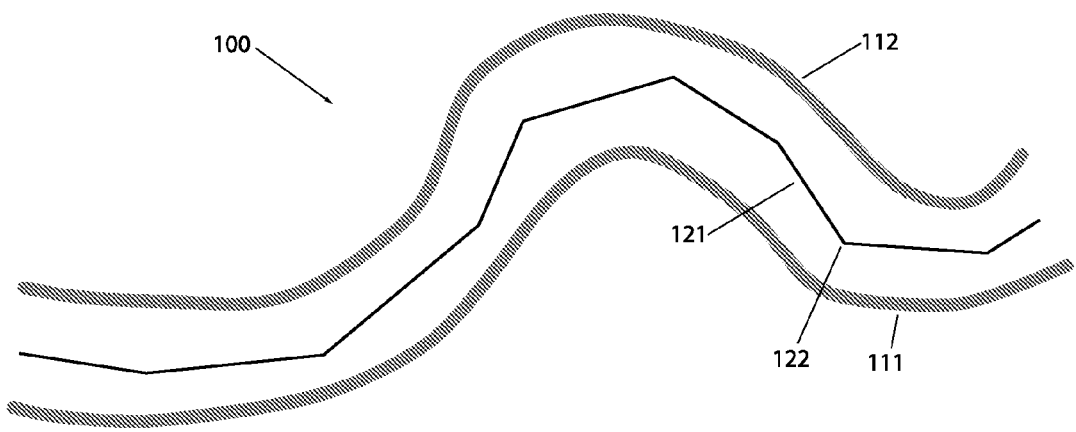
FIG. 1 shows a schematic representation of a roadway and a piecewise-linear roadway centerline according to the invention.

FIG. 1 shows a schematic representation of a roadway and a piecewise-linear roadway centerline according to the invention. A set of vertices 122 define the end points of connected linear segments 121 that approximate the centerline between the physical edges 111 and 112, e.g. curbs or embankments, of the roadway. Typically, the route planning system receives this definition from an external data source, e.g. a GIS database containing roadway definitions for a particular region.

Figure 2:
FIG. 2 shows a schematic representation of a smoothed roadway centerline according to the invention.

FIG. 2 shows a schematic representation of a smoothed roadway centerline according to the invention. Generally, the smoothed roadway centerline 210 rounds the corners of the piecewise-linear roadway centerline. In one embodiment of the invention, the route planning system creates the smoothed roadway centerline through the application of fillets on interior corners and chamfers on exterior corners of radius R tangent to adjacent segments of the piecewise-linear roadway centerline. Alternatively, splines or other smoothing mechanisms can be used. Preferably, the radius R of the fillets and chamfers or a characteristic radius of the smoothing mechanism is based on the minimum capable or minimum desired turning radius of the vehicle.

Figure 3:
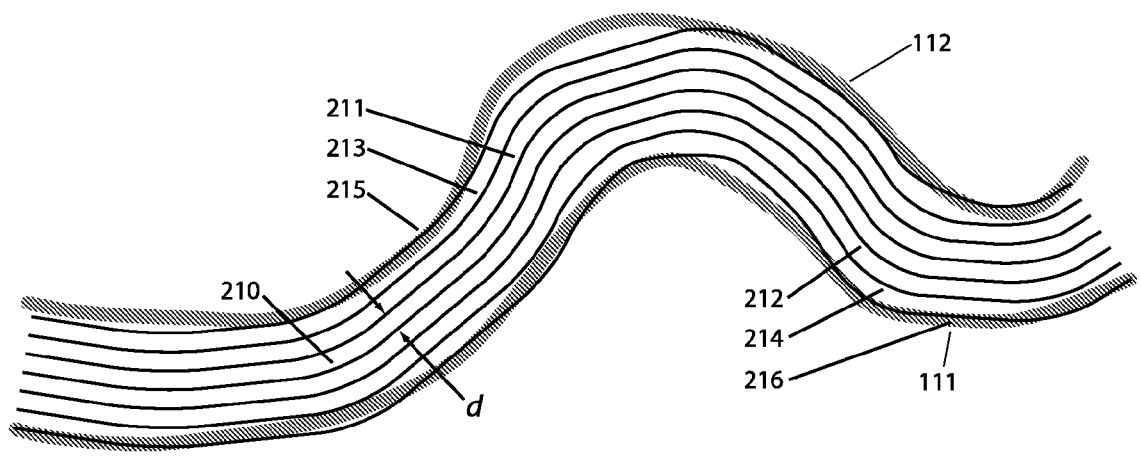
FIG. 3 shows a schematic representation of roadway microlanes according to the invention.

FIG. 3 shows a schematic representation of roadway microlanes according to the invention. The microlanes are offset curves successively separated from the smoothed roadway centerline by a distance d in a direction locally perpendicular to the centerline. FIG. 3 shows seven microlanes 210-216, including the smoothed roadway centerline itself, but a larger or smaller number of microlanes may be used.

The route planning system uses the microlanes to determine a preferred forward trajectory on the roadway. As noted above, the navigational method used by the route planning system is based on the definition of two planning regions, i.e. a near field and a far field.

Figure 4:
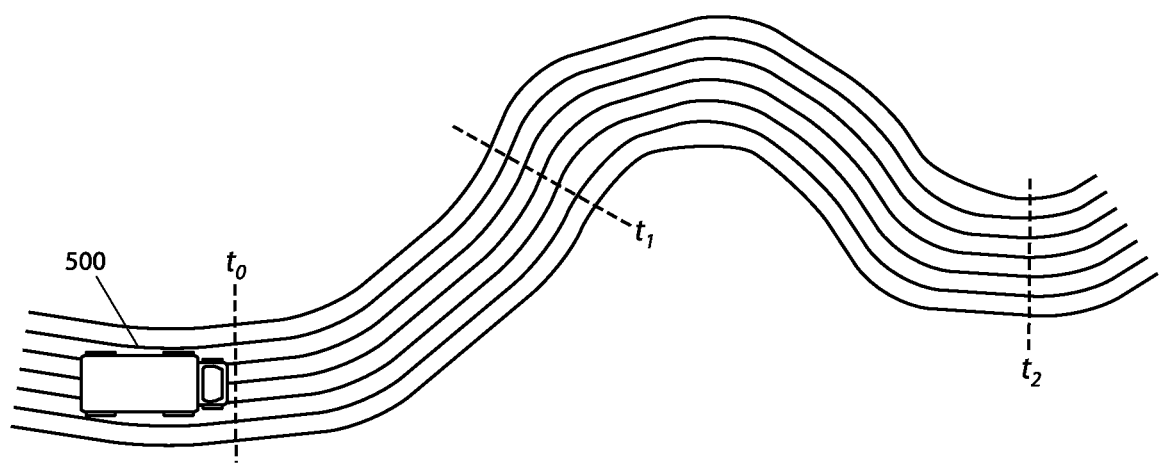
FIG. 4 shows a near field and a far field along a roadway according to the invention.

FIG. 4 shows a near field and a far field along a roadway according to the invention. The near field extends along the roadway from a transverse line through the position of the vehicle 500 at current time $t_0$ to a transverse line through the predicted position of the vehicle, based on current vehicle speed, at future time $t_1$. The far field extends along the roadway from the end of the near field to the predicted position of the vehicle at future time $t_2$.

On account of its relative proximity to the vehicle, the near field is characterized by a high degree of fidelity in the measurements obtained from sensors used to assess the vehicle's surroundings. In contrast, the far field is characterized by a relatively low degree of fidelity in sensor measurements.

In some embodiments of the invention a LIDAR unit, i.e. an optical remote sensing device that can measure the distance to, or other properties of, targets by illuminating the target with laser light and analyzing the backscattered light, is used for measurement. For example, the spatial resolution of distance measurements obtained from a LIDAR unit with a fixed angular resolution is greater in the near field than in the far field. In addition, the absolute precision in distance measurements, given a certain relative precision of the LIDAR unit, is greater in the near field. Similarly, the spatial resolution of images obtained from onboard video cameras and the absolute precision of distances computed from a stereo correspondence between such images is greater in the near field than in the far field.

For illustrative convenience, FIG. 4 shows the length of the near field, i.e. the distance between $t_0$ and $t_1$, as comparable to the length of the far field, i.e. the distance between $t_1$ and $t_2$. In actual practice, the far field may be substantially longer than the near field. For example, typical values for the times defining the regions may be $t_1=2$ s and $t_2=7$ s, implying time-lengths of the near and far fields of 2 s and 5 s, respectively. The precise values of $t_1$ and $t_2$ may be chosen based on the fidelity of the sensors and the reliability with which the vehicle can track a trajectory once determined.

Figure 5:
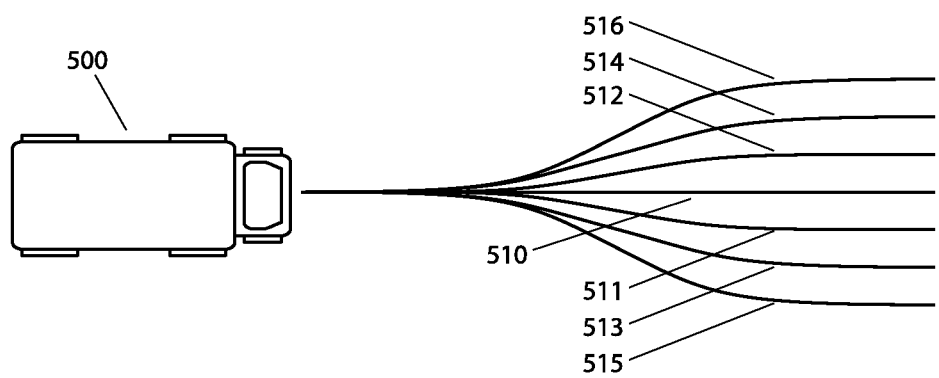
FIG. 5 shows a set of candidate vehicle maneuvers between microlanes according to the invention.

FIG. 5 shows a set of candidate vehicle maneuvers between microlanes according to the invention. Each candidate maneuver is a transition in the near field between the current microlane of the vehicle 500 and a destination microlane selected from among all microlanes, including the current microlane. Preferably, each maneuver begins tangent to the current microlane and ends tangent to the destination microlane. For example, in the roadway of FIG. 3, with the vehicle currently tracking the center of seven microlanes, the set of candidate maneuvers includes three rightward maneuvers 511, 513, 515, three leftward 512, 514, 516 maneuvers, and one straight maneuver 510.

Figure 6:
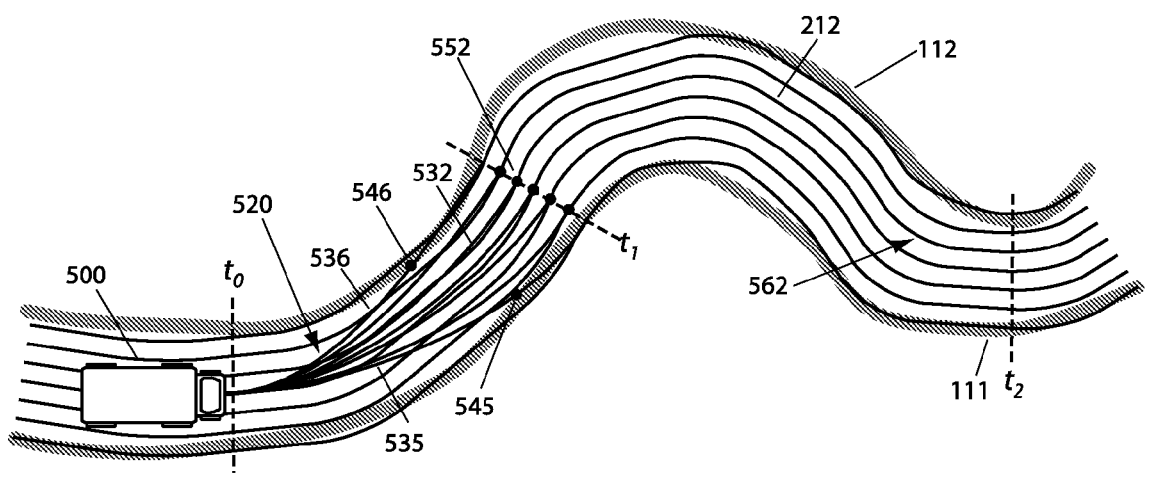
FIG. 6 shows a set of candidate vehicle trajectories along the roadway of FIG. 3 according to the invention.

FIG. 6 shows a set of candidate vehicle trajectories along the roadway of FIG. 3 according to the invention. Each trajectory comprises the union of a near-field maneuver and a corresponding microlane in the far field. For example, trajectory 562 comprises a leftward maneuver 532 in the near field joined to microlane 212 in the far field at a destination 552 along the transverse line corresponding to time $t_1$ demarcating the boundary between the near and far fields.

The route planning system evaluates each trajectory within the set of candidate trajectories to determine an optimal trajectory. Evaluation begins with consideration of the near-field maneuvers. The route planning system eliminates from further consideration those trajectories that begin with non-viable near-field maneuvers. For example, in FIG. 6, the route planning system discards the trajectories beginning with maneuvers 535 and 536 because these maneuvers intersect the physical edges 111 and 112 of the roadway at points 545 and 546. Similarly, the route planning system can discard trajectories that begin with maneuvers passing through unacceptably hazardous obstacles or terrain features within the near field. The route planning system then considers the remaining trajectories for quantitative scoring.

Figure 7:
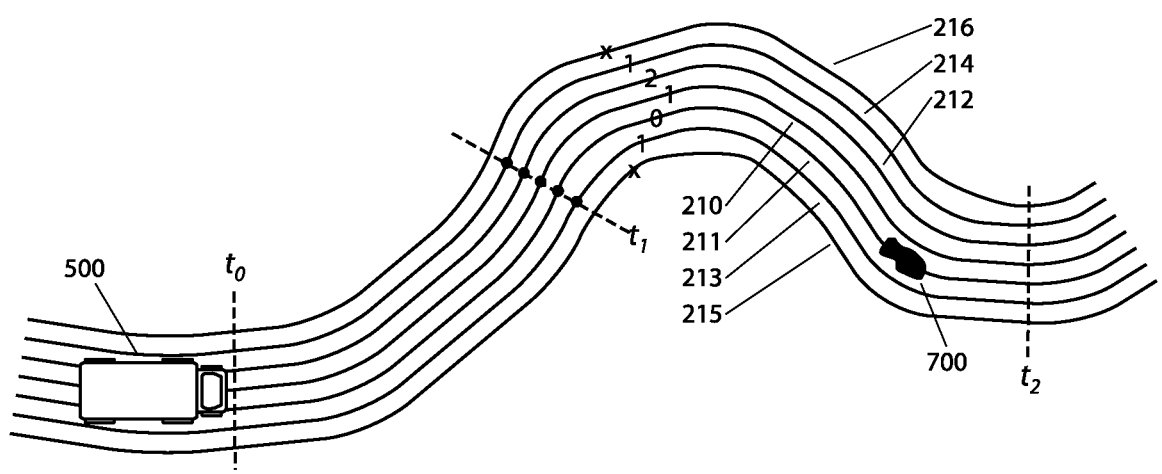
FIG. 7 shows a set of quantitative scores for the set of microlanes within the far field of the roadway of FIG. 3 according to the invention.

FIG. 7 shows a set of quantitative scores for the set of microlanes within the far field of the roadway of FIG. 3 according to the invention. Scoring begins with an evaluation of the remaining trajectories in the far field. Specifically, the route planning system analyzes the microlane of each remaining trajectory in the far field. As noted above, the fidelity of sensor measurements in the far field is presumed to be low relative to sensor measurements in the near field. Thus, in the preferred embodiment, the route planning system attempts to determine only whether each microlane is viable, i.e. specifically whether each microlane contains or does not contain an obstacle or terrain feature that would render it impassable. In one embodiment of the invention, the route planning system calculates a scalar traversability score for each of the microlanes in the far field and determines that the microlane is passable if the traversability score is below above predetermined threshold. The traversability score may be based upon, for example, the roughness of the roadway surface along the microlane, the curvature of the microlane, and the presence or absence of any obstacles along the microlane.

The route planning system assigns a score of 0 to each trajectory comprising a microlane determined to be impassable in the far field, eliminating them from further consideration. For microlanes determined to be passable in the far field, the route planning system assigns a score equal to one greater than the number of adjacent microlanes between the microlane and the nearest impassable microlane or un-scored microlane. The route planning system then selects the trajectory including the microlane with the highest score and marks for execution the near-field maneuver within the selected trajectory.

For example, in FIG. 7, the route planning system does not score microlanes 215 and 216 because each comprises non-viable near-field maneuvers, namely maneuvers 535 and 536 in FIG. 6. Microlane 211 is determined to be impassable on account of an obstacle 700 detected by the sensors in the far field. Accordingly, the route planning system assigns a score of 0 to microlane 211. Microlane 213 receives a score of 1 because it is passable but no microlanes lie between it and the nearest impassable microlane 211 or un-scored microlane 215. Microlane 210 also receives a score of 1 because it is passable but no microlanes lie between it and the nearest impassable microlane 211. Microlane 214 also receives a score of 1 because it is passable but no microlanes lie between it and the nearest un-scored microlane 216. Finally, microlane 212 receives a score of 2 because it is passable and one microlane lies between it and each of the nearest impassable microlane 211 and un-scored microlane 216. Thus, in the example of FIG. 7, the route planning system selects the trajectory comprising the highest scoring microlane 212 and marks for execution the corresponding near field maneuver 532.

In those instances when two or more microlanes share the highest score, the route planning system may select a trajectory, i.e. break the tie, by comparing quantitative costs of the near-field maneuvers. In one embodiment of the invention, the route planning system uses sensor measurements to discretely characterize the near-field terrain on a grid of cells. Each cell within the grid is evaluated using multiple criteria. For example, using a scanning LIDAR, the route planning system can determine the height differential between the highest and lowest perimeter points of the cell, i.e. a slope calculation. The route planning system combines the multiple criteria to determine the maximum safest speed at which the vehicle can traverse the cell. The cost of a cell is inversely proportional to the speed determined. The cost of a near-field maneuver is proportional to the sum, along the maneuver, of the products of the cost of each cell and the length of the maneuver within that cell. Among the trajectories with far field microlanes with equal scores, the route planning system selects the trajectory comprising the near-field maneuver with the lowest cost.

One skilled in the art will appreciate that many variations of the invention are possible. As described above, when evaluating each trajectory in the far-field, the route planning system makes a Boolean determination for each microlane; the microlane is determined to be either passable or impassable and scores are computed for the microlanes based on these Boolean values. In an alternative embodiment of the invention, the route planning system uses the scalar traversability score described above to compute the scores for each microlane.

As described above, each microlane determined to be impassable receives a score of zero. For each passable microlane, the route planning system assigns a score equal to the sum of the traversability score of the microlane and
- the combined leftward sum and rightward sum of traversability scores, or
- the minimum of the leftward sum and rightward sum of traversability scores, or
- the maximum of the leftward sum and rightward sum of traversability scores.

The leftward sum of traversability scores is the sum of the traversability scores of the microlanes between the microlane and the nearest leftward impassable or un-scored microlane. Similarly, the rightward sum of traversability scores is the sum of the traversability scores of the microlanes between the microlane and the nearest rightward impassable or un-scored microlane.

As described above, the route planning system uses the costs computed for the near-field maneuvers solely to select between trajectories including equally scored microlanes in the far field. In an alternative embodiment of the invention, the route planning system combines the far-field scores with the near-field costs to compute an overall desirability of each trajectory. The relative weight assigned to these two factors in computing the overall desirability can be adjusted to balance the relative influence of the near- and far-field calculations.

Generally, though, as can be observed in the preferred embodiment, the route planning system is designed to provide robust trajectories in the face of substantial sensor uncertainty in the far field. Given this uncertainty, the route planning system selects a trajectory that includes the viable, but not necessarily optimal, maneuver in the near field that provides the greatest degree of flexibility and resilience in navigating the relatively poorly characterized far field. In this regard, the invention is widely applicable to many planning systems.

Further, those skilled in the art will appreciate that applications of the invention are not limited to vehicles travelling through physical space. For example, the near field, far field, and composite plans need not be spatial trajectories, and the space need not be physical, 3D space. The space could be a decision space, e.g. choosing a series of apartments to rent over time, or choosing a set of jobs defining a career path. The composite plan would then be a set of decisions, with the most immediate decisions corresponding to the near field plan.

Figure 8:
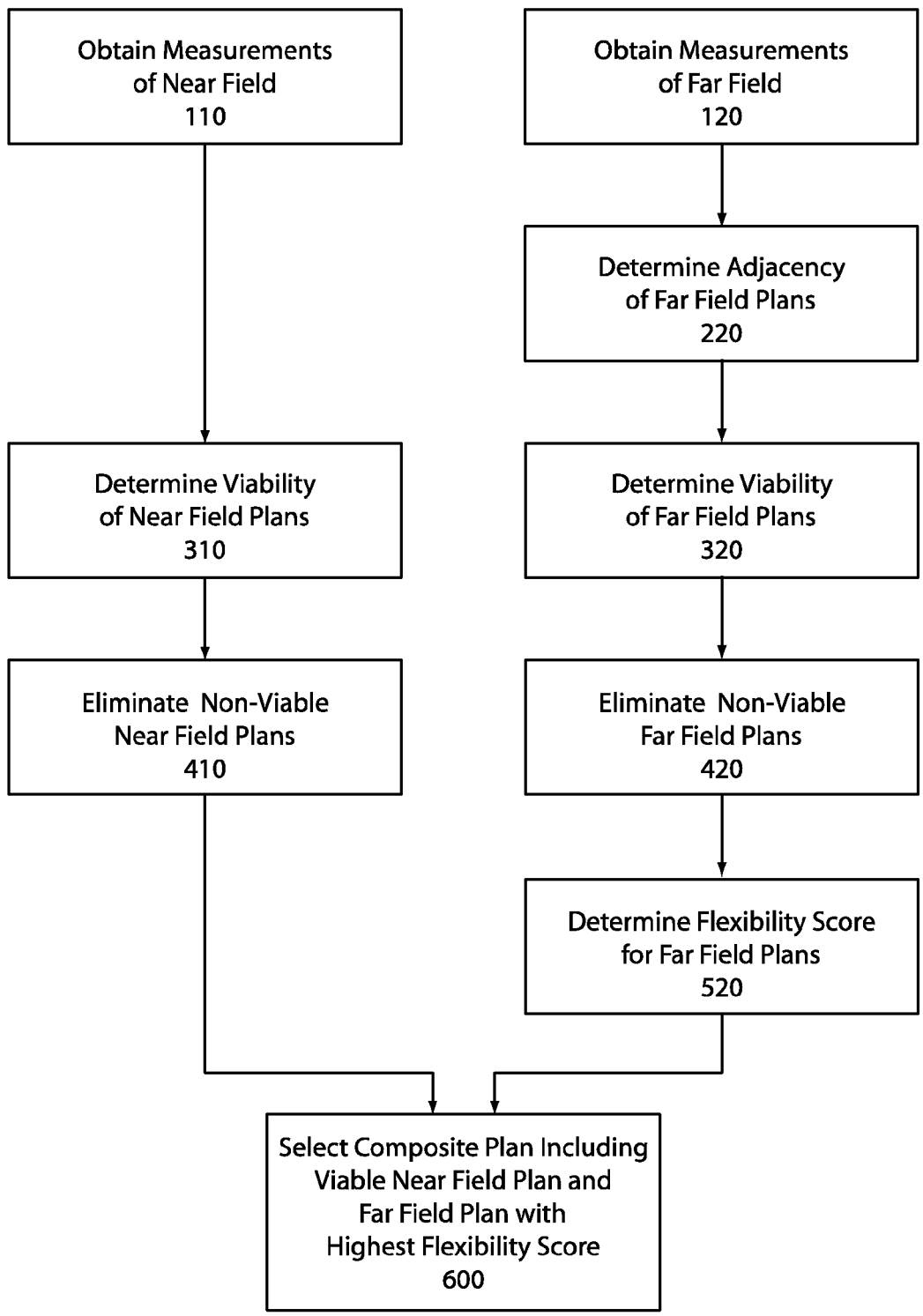
FIG. 8 shows a flow chart summarizing the operation of a two-stage planning method according to the invention.

FIG. 8 shows a flow chart summarizing the operation of a two-stage planning method according to the invention. Using the method of FIG. 8, a planning system selects a composite plan from among a set of candidate composite plans. Each candidate composite plan is formed from the union of a near field plan, selected from among a set of candidate near field plans, and a far field plan, selected from among a set of candidate far field plans.

Operation begins with the planning system obtaining measurements of the near 110 and far 120 fields. The distinction between the near and far fields may be spatial, temporal, or both, as in the case of trajectories through physical space such as those of FIG. 4. As noted above, on account of its spatial or temporal proximity, the near field is characterized by a high degree of fidelity in the measurements obtained. In contrast, the far field is characterized by a relatively low degree of fidelity in sensor measurements.

The planning system then determines the viability of each of the candidate near field plans 310, and eliminates 310 from consideration those near field plans determined to be non-viable. The planning system performs the viability determination using the high fidelity measurements of the near field.

In parallel, the planning system determines the adjacency of the candidate far field plans 220. The planning system considers one far field plan adjacent to a second far field plan if it is possible to transition directly from the first far field plan to the second far field plan upon arrival at the boundary between the near and far fields. In some applications of the planning system, the adjacency of the far field plans may possess a topology such as the microlanes shown in FIG. 3, in which each far field plan, i.e. microlane, is adjacent to one or two neighboring far field plans. In other applications of the planning system, each far field plan is potentially adjacent to zero, one, or many other far field plans. In such applications, the adjacency of the far field plans can be summarized with a matrix A in which $a_{ij}=1$ if the ith far field plan is adjacent to the jth far field plan and $a_{ij}=0$ otherwise. The matrix A may be symmetric or asymmetric, depending on whether adjacency is necessarily physically symmetric in nature.

The planning system then determines the viability of each candidate far field plan 320 and eliminates 420 from consideration those far field plans determined to be non-viable. The planning system performs the viability determination using the low fidelity measurements of the far field. Viability of the far field plans is thus determined based on the most easily resolved features of the far field.

The planning system then determines a flexibility score for each of the far field plans 520 determined to be viable. In those applications where each far field plan has either one or two neighbors, the flexibility score of a far field plan may be computed as the distance between the far field plan and the nearest non-viable far field plan. In some such applications, e.g. the route planning system of FIG. 7, the distance may be enumerated by counting the number of intervening far field plans, e.g. microlanes of FIG. 7. In other such applications, the distance may be quantified with a physical distance.

In those applications where each far field plan is potentially adjacent to zero, one or many other far field plans, the flexibility score of a far field plan may be computed as the number of adjacent far field plans. If the adjacency is summarized in a matrix A as described above, the adjacency of the ith far field plan may be computed by summing the ith row of A.

Finally, the planning system selects the composite plan that includes a viable near field pan and the far field plan with the highest flexibility score 600. In some applications of the planning system, e.g. the route planning system of FIG. 6, each near field plan, e.g. maneuver, uniquely corresponds to a single far field plan, e.g. microlane. In such applications, the selected composite plan comprises the far field plan with the highest flexibility score and the unique corresponding near field plan. In other applications of the planning system, more than one near field plan may be compatible with, i.e. lead to, the far field plan with the highest flexibility score. In such cases, the planning system can select a composite plan by comparing quantitative, scalar cost measures beyond the Boolean viable or non-viable determination of the near field plans.

As shown in FIG. 8, the planning system obtains measurements of the near 110 and far field 120 in parallel. Similarly, the planning system can determine the viability of the candidate near field plans 310 and eliminate non-viable near field plans 410 in parallel with determining the adjacency of the candidate far field plans 220, determining the viability of the candidate far field plans 320, and eliminating non-viable far field plans 420. In an alternative embodiment of the invention, the planning system performs these tasks in series. In particular, eliminating the non-viable near field plans 410 prior to determining the flexibility score of the far field plans 520 allows the planning system to determine a flexibility score only for those far field plans compatible with viable near field plans. This approach reduces the computational load placed on the planning system. This alternate embodiment is particular useful in applications where there is a unique correspondence between near and far field plans, e.g. the near field maneuvers and far field microlanes of FIG. 6.

Computer Implementation

Figure 9:
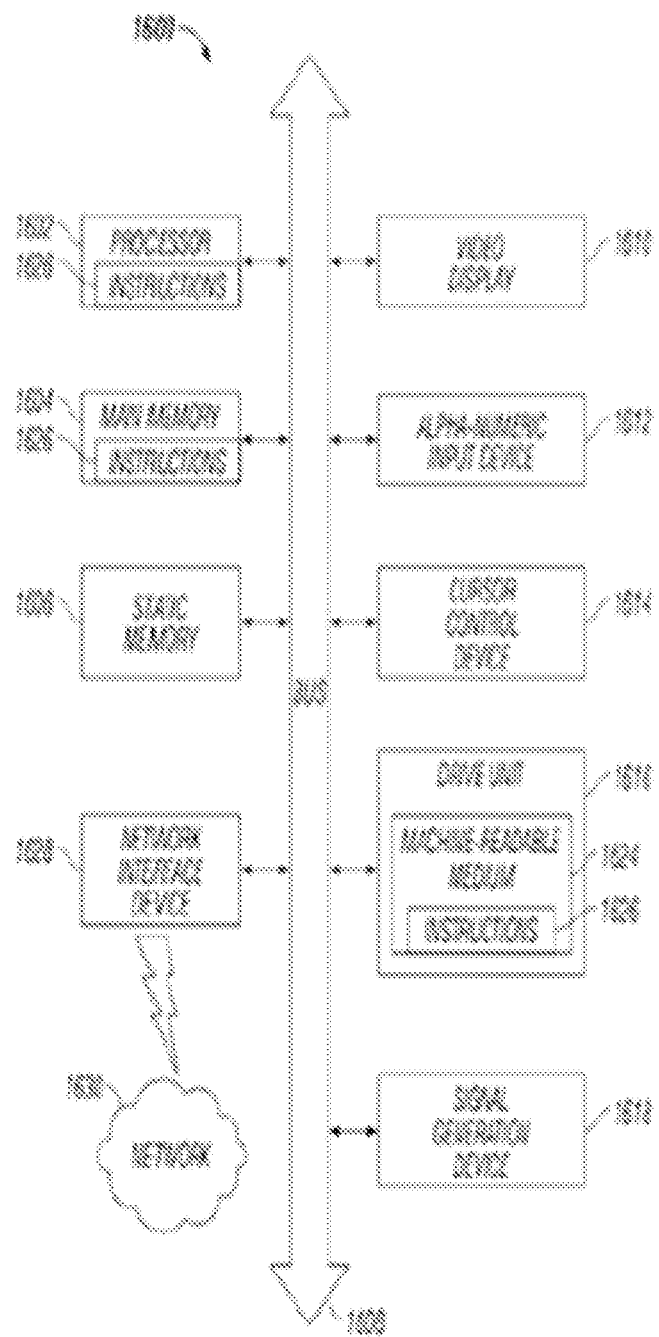
FIG. 9 is a block schematic diagram that depicts a machine in the exemplary form of a computer system within which a set of instructions for causing the machine to perform any of the herein disclosed methodologies may be executed.

FIG. 9 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method of determining a plan through a space comprising a near field and a far field, comprising:
    with a sensor device, obtaining measurements of said far field and storing said measurements in an electronic memory;
    with a processor, determining, based on said measurements of said far field, the viability of each far field plan among a plurality of candidate far field plans;
    with said processor, determining a flexibility score for each of said candidate far field plans; and
    with said processor, selecting a composite plan comprising a far field plan having the highest flexibility score among those candidate far field plans that have been determined to be viable;
    wherein the near field extends along a roadway from a starting transverse line through a current position to a first transverse line though a first future position at a first future time, and where in the far field extends along the roadway from the first transverse line to a second transverse line through a second future position at a second future time.

2. The method of claim 1, further comprising:
with a sensor device, obtaining measurements of said near field; and
with said processor, determining, based on said measurements of said near field, the viability of each near field plan among a plurality of candidate near field plans;
wherein said composite plan additionally comprises a viable near field plan that is compatible with said far field plan having the highest flexibility score.

3. The method of claim 1, further comprising:
with said processor, determining the adjacency of said candidate far field plans, wherein a first of said candidate far field plans is adjacent to a second of said candidate far field plans if it is possible to transition directly from said first candidate far field plan to said second candidate far field plan after arrival at the boundary between said near field and said far field; and
wherein said flexibility score is based upon any of:
the number of intervening far field plans between a candidate far field plan and a nearest non-viable far field plan;
the physical distance between a candidate far field plan and the nearest non-viable far field plan; and
the number of far field plans adjacent to a candidate far field plan.

4. The method of claim 1, wherein said composite plan comprises a trajectory for an autonomous vehicle; and
wherein said near field and said far field comprise near and far regions along a driving surface.

5. The method of claim 1, wherein said candidate far field plans comprise offset curves from a roadway centerline.

6. The method of claim 2, wherein said candidate near field plans comprise a set of candidate maneuvers; and
wherein each candidate maneuver is a transition in said near field between a current microlane and a destination microlane selected from among all microlanes, including said current microlane.

7. An apparatus determining a plan through a space comprising a near field and a far field, comprising:
a processor configured for determining, based on measurements taken with a sensor device obtaining measurements of said far field, the viability of each far field plan among a plurality of candidate far field plans;
said processor configured for determining a flexibility score for each of said candidate far field plans; and
said processor configured for selecting a composite plan comprising a far field plan having the highest flexibility score among those candidate far field plans that have been determined to be viable;
said processor setting said flexibility score to 0 for each non-viable far field plan, thereby eliminating said non-viable far field plans from further consideration;
for each viable far field plan, said processor setting said flexibility score to one greater than the number of said candidate far field plans between said viable far field plan and a nearest impassable far field plan.

8. The apparatus of claim 7, further comprising:
said processor determining, based on measurements taken with a sensor device of said near field, the viability of each near field plan among a plurality of candidate near field plans;
wherein said composite plan additionally comprises a viable near field plan that is compatible with said far field plan having the highest flexibility score.

9. The apparatus of claim 7, further comprising:
said processor configured for determining the adjacency of said candidate far field plans, wherein a first of said candidate far field plans is adjacent to a second of said candidate far field plans if it is possible to transition directly from said first candidate far field plan to said second candidate far field plan after arrival at the boundary between said near field and said far field; and
wherein said flexibility score is based upon any of:
the number of intervening far field plans between a candidate far field plan and a nearest non-viable far field plan;
the physical distance between a candidate far field plan and the nearest non-viable far field plan; and
the number of far field plans adjacent to a candidate far field plan.

10. The apparatus of claim 7, wherein said composite plan comprises a trajectory for an autonomous vehicle; and
wherein said near field and said far field comprise near and far regions along a driving surface.

11. The apparatus of claim 7, wherein said candidate far field plans comprise offset curves from a roadway centerline.

12. The apparatus of claim 8, wherein said candidate near field plans comprise a set of candidate maneuvers; and
wherein each candidate maneuver is a transition in said near field between a current microlane and a destination microlane selected from among all microlanes, including said current microlane.

13. The apparatus of claim 7, wherein said candidate far field plans comprise segments of microlanes passing through said far field.

14. The apparatus of claim 13, further comprising:
said processor calculating a scalar traversability score for each of said microlanes in said far field and determining that the corresponding far field plan is viable if said traversability score is above a predetermined threshold;
wherein said traversability score is based upon any of the roughness of a roadway surface along said microlanes, the curvature of said microlanes, and the presence or absence of any obstacles along said microlanes.

15. The apparatus of claim 12, further comprising:
for those instances when two or more far field plans share said highest flexibility score, said processor selecting a composite plan by comparing a quantitative cost of said candidate maneuver within said composite plan.

16. The apparatus of claim 15, further comprising:
said processor using sensor measurements to discretely characterize the near field terrain on a grid of cells, wherein each cell within said grid of cells is evaluated using multiple criteria;
said processor combining said multiple criteria to determine a maximum traversal speed for said cell;
wherein the cost of each cell is inversely proportional to said traversal speed; and
wherein said quantitative cost of said candidate maneuver is proportional to the sum, along said candidate maneuver, of the products of said cost of each cell and the length of said candidate maneuver within that cell.

17. The apparatus of claim 15, wherein among composite plans comprising far field microlanes with equal flexibility scores, said processor selects the composite plan comprising the candidate maneuver with the lowest quantitative cost.

18. The apparatus of claim 13, further comprising:
when evaluating each far field plan, said processor making a Boolean determination for the microlane within each far field plan;
wherein a microlane is determined to be either passable or impassable and said flexibility score is determined for each of said far field plans based on said Boolean determination.

19. The apparatus of claim 13, further comprising:
  when evaluating each far field plan, said processor computing a scalar traversability score for the microlane within each far field plan.

* * * * *